Oct. 11, 1966  J. R. RUNYON  3,278,824
AUTOMATIC CHARGING SYSTEM FOR ELECTRIC STORAGE DEVICES
Filed Aug. 15, 1963  4 Sheets-Sheet 2
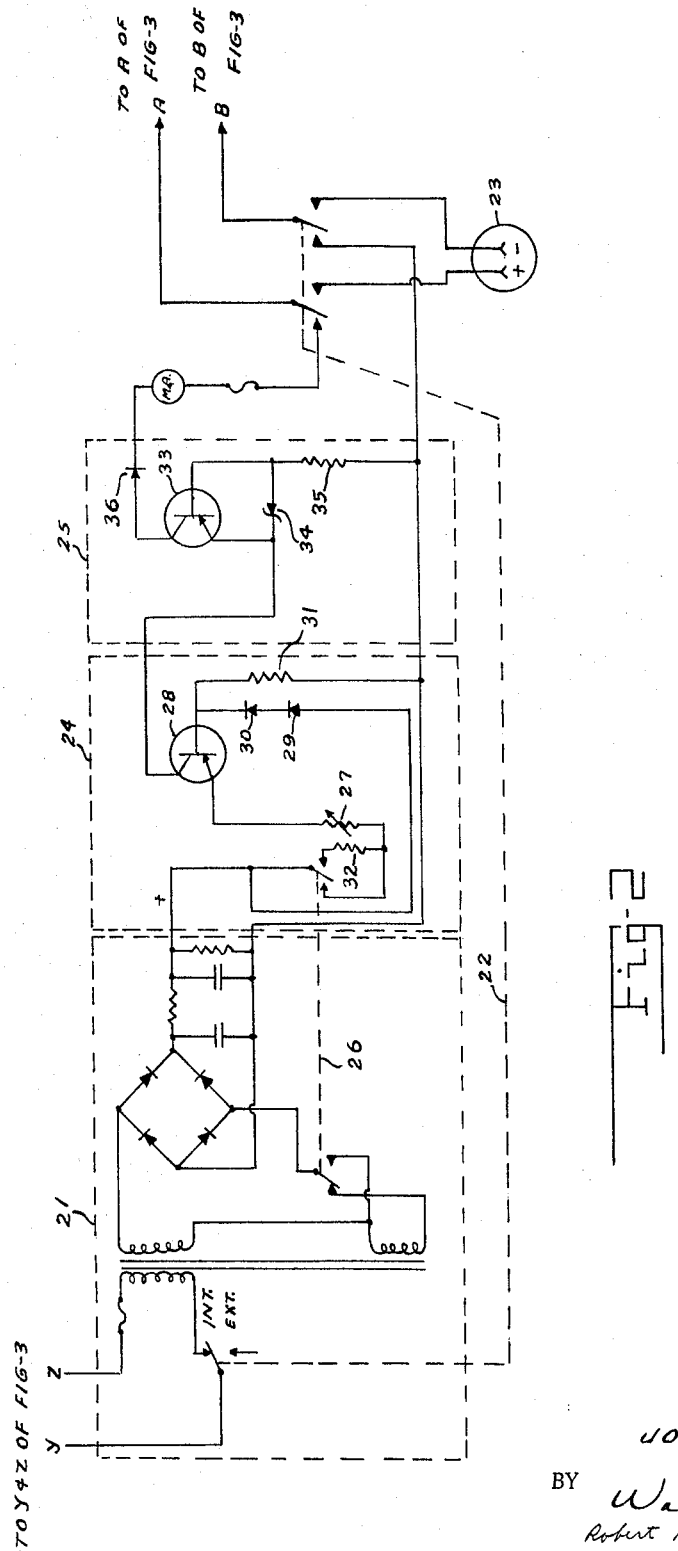
INVENTOR.
JOHN R. RUNYON
BY
ATTORNEYS

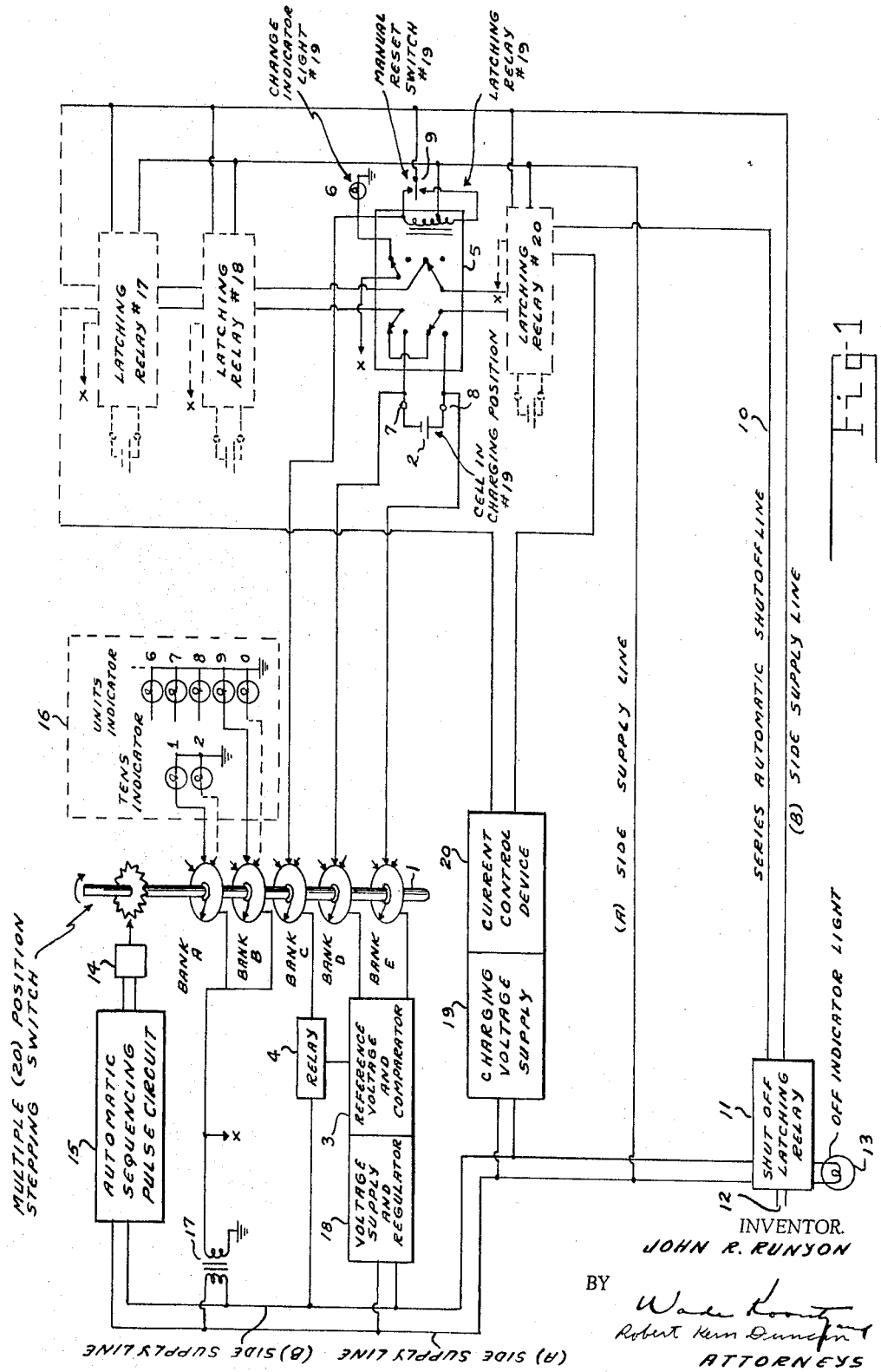

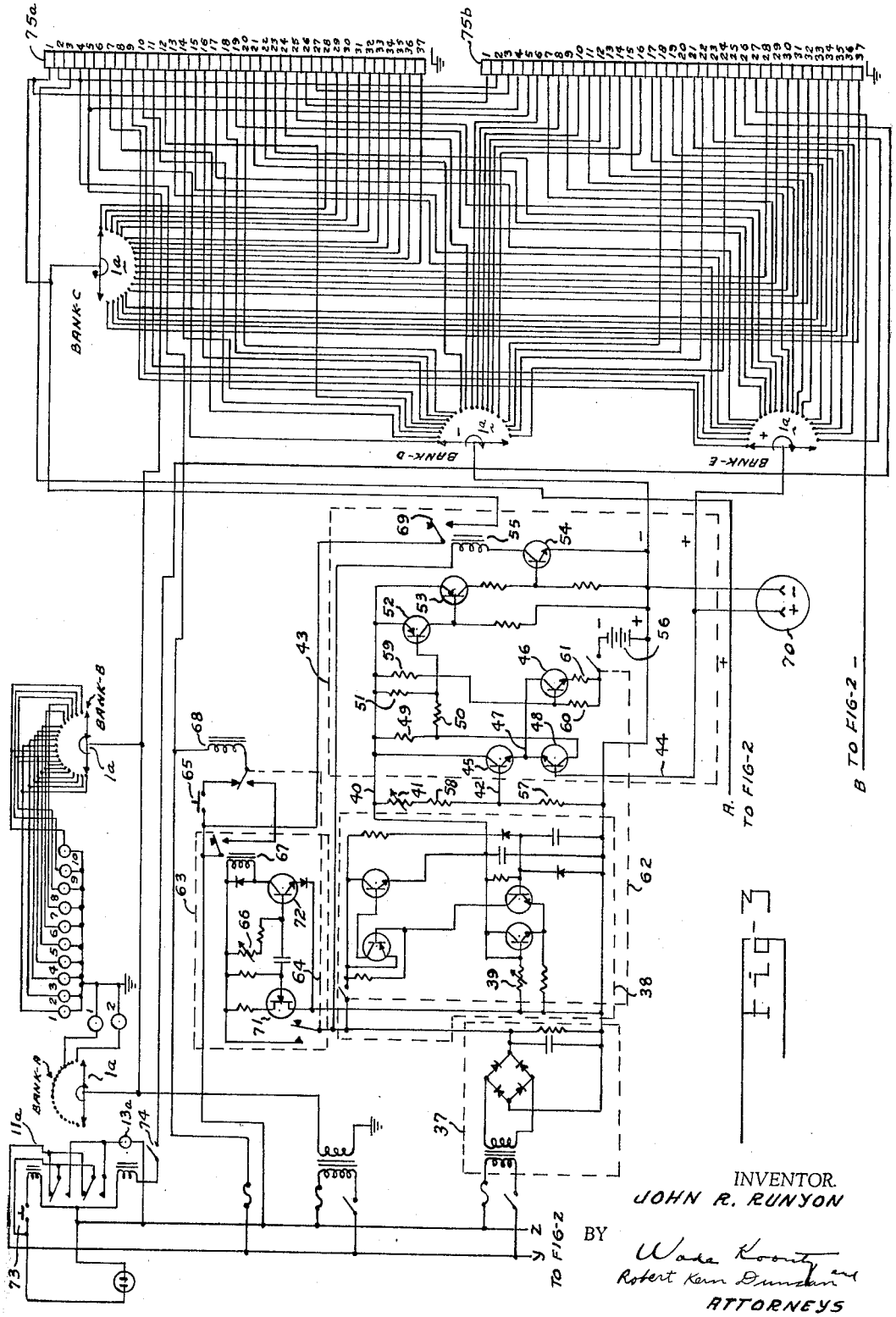

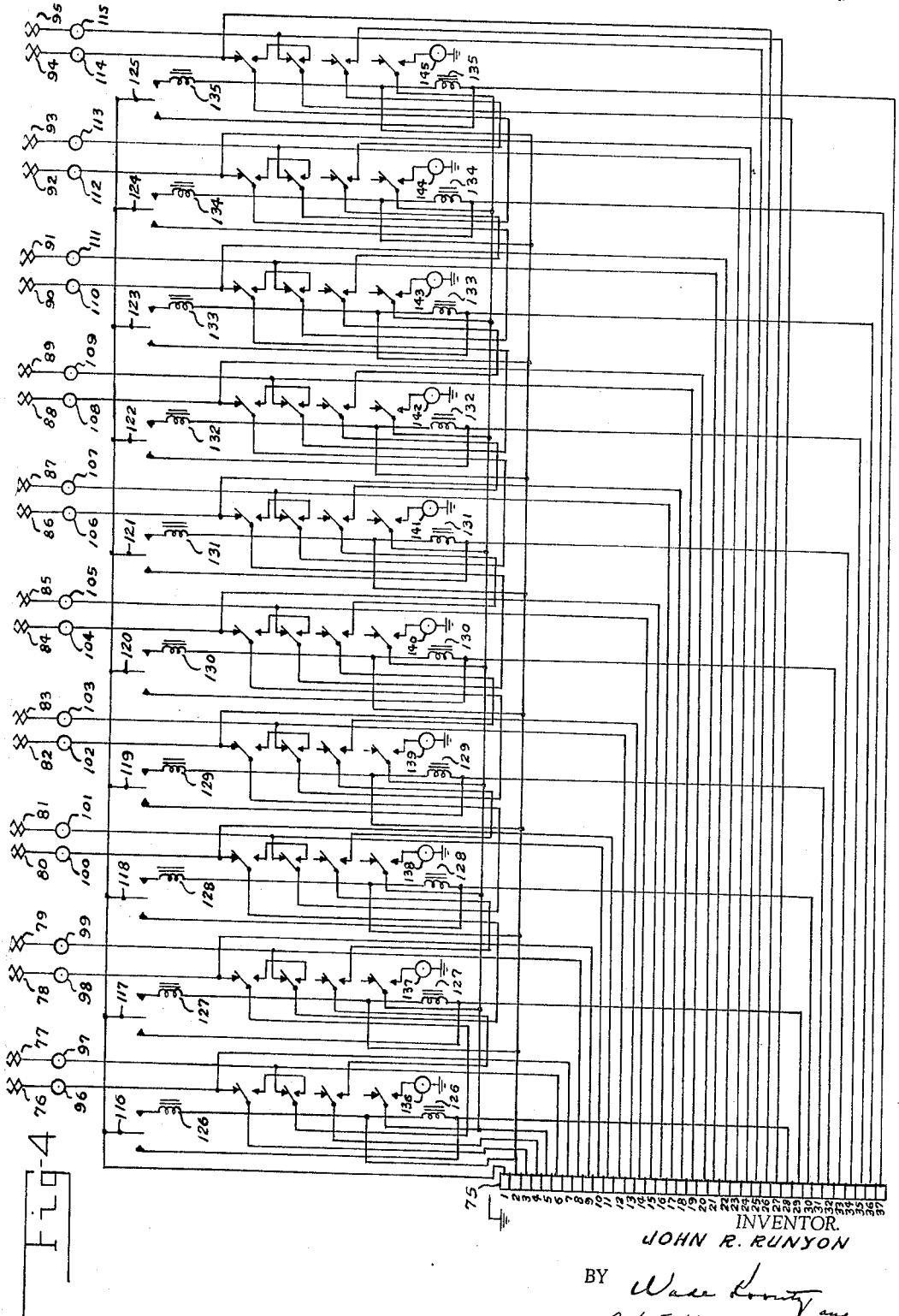

United States Patent Office 3,278,824
Patented Oct. 11, 1966

3,278,824
AUTOMATIC CHARGING SYSTEM FOR ELECTRIC STORAGE DEVICES
John Robert Runyon, c/o Air Force Weapons Laboratory (WLRJ), Kirtland Air Force Base, N. Mex.
Filed Aug. 15, 1963, Ser. No. 302,485
4 Claims. (Cl. 320—29)

The invention described herein may be manufactured and used by or for the United States Government for governmental purposes without payment to me of any royalty thereon.

This invention relates to an automatic charging and monitoring device for a plurality of electric storage devices such as a plurality of single cell storage devices or a plurality of batteries, each battery being a unit composed of more than one cell. More specifically, it is a device for automatically charging a plurality of rechargeable cells or batteries, each to a definite predetermined voltage, and upon the completion of the charging of all of the electric storage devices, automatically turning off the charging and monitoring equipment and so indicating the completion of the task.

Numerous electric storage device charging systems are presently in use, either for charging single cells or batteries or for the simultaneous charging of many cells or batteries. Automobiles and similar vehicles have well-developed charging means for single batteries, and multiple battery charging systems are in use in many automotive garages and service stations. The major disadvantages of all the multiple systems are, either that they require almost constant attendance, involving the readjusting of the charging current and the disconnecting of storage devices that have become fully charged, or the multiple charging systems do not charge the storage devices uniformly with the control and monitoring means afforded by the single cell or single battery type charger.

In the present invention, a charging and monitoring system is provided that will charge a plurality of electrical storage devices, while monitoring each storage device independently. When the monitoring circuit determines that a particular storage device is charged to a predetermined voltage it will remove the charging current from that unit, re-establish the series charging line, and indicate that this particular storage device is completely charged. The charger will then continue to charge the remaining units until all are fully charged, at which time it will disconnect the charging and monitoring system from the source of electrical energy and illuminate an indicator indicating that all the storage devices are fully charged and that the equipment has automatically turned off.

Another object is to provide a charging and monitoring system for a plurality of electrical storage devices that will indicate which storage device is, at any particular instant of time, connected to the automatic monitoring system.

Another object is to provide a charging and monitoring system that requires the services of an operator only during the period of programming and initial setting up, the system being automatic in operation from that period on until after all the storage devices are charged and the system has turned off.

Another object is to provide a charging and monitoring system that provides a convenient means for the application of control-discharging means to individual storage devices without the necessity of removing them from the charging and monitoring system.

Another object is to provide a charging and monitoring system that has an automatic current limiting control.

Another object is to provide a charging and monitoring system with automatic current boosting control that will maintain the required current flow into the electric storage devices being charged as their internal voltages increase.

Another object is to provide a charging and monitoring system that will provide the extreme accuracy of cutout of $1/100$ volt per storage device in the voltage range in excess of one volt.

The embodiment set forth pertains to a plurality of electric storage devices of the single cell type, however, it is to be understood that a plurality of multiple cell units, commonly called batteries, may be charged by the system described herein by adjusting the voltage and current characteristics of the system to be compatible with the characteristics of the type cells or batteries being charged. The system may be readily adapted for various input line voltages and frequencies by using transformers and relays of the appropriate characteristics. A direct current supply source could also be utilized without departing from the principles disclosed herein. The embodiment set forth also shows the invention as it is applied to a charging and monitoring control system for twenty electric storage devices. A larger system for a greater number of storage devices or a smaller system for a lesser number of storage devices could be constructed by increasing or decreasing the number of positions on the stepping switch and using a corresponding number of indicator lights and latching relays. In addition, solenoid actuated draw-bar type switches could be used in place of the rotary stepping switch.

Other objects and many of the attendant advantages of this invention will be readily appreciated as the same becomes understood by reference to the following detailed description when considered in connection with the accompanying drawings wherein:

FIGURE 1 is a block diagram embodying the present invention;

FIGURE 2 is a schematic diagram of the charger voltage supply, the current limiting circuit, the current boost circuit, and the connections for an external current supply source;

FIGURE 3 is a schematic diagram of the power supply, the voltage regulator, the voltage comparator, the cutout control relay, the stepping switch, the timing control circuit for actuating the stepping switch, the indicator circuitry, and the automatic shutoff relay; and FIGURE 4 is a schematic diagram of the latching cutout relays, with the associated indicator circuitry. Ten charging positions are shown. A duplicate set of ten additional positions is required to complete the system in this embodiment for twenty electrical storage devices.

Referring to the drawings more in detail, the operation of the system may best be understood by first referring to the block diagram of FIGURE 1. Stepping switch 1 is a conventional five-bank, twenty-position stepping switch. Only the connections for cell position number nineteen are shown in detail. Positions numbers seventeen, eighteen and twenty are shown in skeleton form with it being understood that all the positions from one through twenty are similar in nature.

In the situation shown in FIGURE 1, cell 2 has been charged to the preset reference voltage contained in the reference voltage and comparator unit 3. This comparison has been made on a previous rotation of stepping switch 1. At that time of comparison, relay 4 was actuated by the output from the comparator in 3. The actuation of relay 4 actuated latching relay 5 removing cell 2 from the series charging circuit, and lighting charge indicator light 6. Depending upon the type of cell involved, it is quite frequently desirable to discharge a cell at a controlled rate after it has been fully charged. Terminals 7 and 8 permit the application of a discharge circuit directly to the cell without removing or disconnecting it from the charging system. To recharge cell 2 it is only necessary to remove the discharge device and actuate manual reset switch 9. Charge indicator light 6 will then be extinguished and cell 2 will be electrically in the series charging circuit, and monitored, by the reference voltage and comparator circuit 3, once for each revolution of stepping switch 1. When new cells are put in the system for charging, the appropriate manual reset switch for each cell must be actuated to place the new cell in the series charging circuit. As each latching relay becomes energized due to the respective battery becoming charged, series automatic shutoff line 10 is being completed through switching contacts in each latching relay. When all latching relays have been energized, series line 10 energizes shutoff latching relay 11, which disconnects the system from the source of energy 12 and illuminates off indicator light 13.

Stepping switch 1 is mechanically rotated by stepping circuit drive mechanism 14. Electrical impulses actuating drive mechanism 14 are received from the automatic sequencing pulse circuit 15. Monitoring indicator lights 16, connected to banks A and B of stepping switch 1, show which cell is being compared with the reference voltage at any particular instant of time. Transformer 17 supplies the voltage and current to illuminate indicator light 16, charge indicator light 6 and the other nineteen charge indicator lights. As stepping switch 1 rotates, the voltage of each of the twenty cells is independently connected to the reference voltage and comparator unit 3 through stepping switch banks D and E. If the voltage of a cell so connected is equal to, or more than, the reference voltage, the output of the comparator energizes relay 4. Relay 4 through the contacts of bank C of stepping switch 1 energizes the latching relay associated with that cell, and that cell is removed from the charging circuit.

Voltage supply and regulator 18 may be any conventional regulated voltage source capable of supplying the power requirements of the connected equipment and the reference voltage circuit. Charging voltage supply 19 supplies the voltage and current as controlled by the current control means 20, for the particular cells or storage devices being charged.

Referring to FIGURE 2, the charging voltage supply 21 is a conventional supply source of unidirectional current with provision for increasing the output voltage controlled by contacts on switch 26. Automatic current limiting circuit 24 operates in the following manner. Switch 26 is used to set what is commonly called a high rate of charge or a low rate of charge. In the position shown, it is set for a high rate of charge. The terms "fast charge" and "slow charge" are also in common use. The usage of this switch is dependent upon the type and condition of the cells being charged. Variable resistance 27 provides an adjustable range of current control within these high and low rates of charge. Transistor 28 is of the PNP type. The base potential is primarily determined by the forward voltage drop in diodes 29 and 30 and the value of resistance 31. The conductivity from the emitter to the collector of transistor 28 is determined by the forward bias existing between the emitter and the base. Since the potential of the base is relatively fixed, the amount of bias is determined by the voltage drop in the resistance in the emitter circuit. Thus, as the current flow through the emitter and collector of transistor 28 tends the rise, the potential of the emitter tends to fall with respect to the base potential due to the increased IR drop in the emitter circuit. As the emitter voltage decreases toward the base potential, the conductivity of the transistor decreases. This action stabilizes the current passed by transistor 28 about a particular predetermined value that is controlled by resistance 27 and resistance 32, if resistance 32 is in the circuit.

As electrical storage devices become charged, their internal voltages increase. This would normally cause a decrease in the charging current flowing into the devices. Current boost circuit 25 raises the charging potential across the storage devices as their internal potentials increase. This action keeps the charging current relatively constant as the storage devices approach their fully charged state. The action of this circuit is best understood by first considering the case in which the storage devices being charged are in a discharged condition. Thus the internal voltage of the storage devices is quite low, the charging voltage is also quite low due to the action of current limiting circuit 24. The electrical potentials of the elements of transistor 33 are also low with respect to the negative voltage potential, and the voltage drop across resistance 35 is small. This places a large back voltage across Zener diode 34 which places it in the "break-down" region of its operating characteristics. This establishes the forward bias between the emitter and the base of transistor 33 at a relatively low value, and conduction through the emitter-collector circuit is limited. As the internal voltages of the storage devices increase, the potentials on the elements of transistor 33 rise. This causes an increased IR drop across resistance 35. As the potential on the base of transistor 33 rises faster than the potential on the emitter, the voltage across Zener diode 34 decreases. A point is thus reached where the back resistance of the Zener diode rapidly increases due to its characteristic action. This increased resistance across the Zener diode places a larger forward bias between the emitter and the base of transistor 33 and its conduction increases. This then permits the current flow into the storage devices to be relatively constant instead of decreasing as their internal voltages increase.

The combined action of current limiting circuit 24 and current boosting circuit 25 is to maintain a relatively fixed rate of charge into the storage devices at all times while they are being charged. Switch 22 provides a means of turning off the charging voltage supply and current control means of the charging system; this permits the connecting of an external charging supply through plug jack 23 when it is desired to use an external supply. Diode 36 prevents the cells from discharging back through the current regulators and voltage supply should the charging system be turned off with the cells connected.

Referring to FIGURE 3, the power supply 37 supplies approximately 30 volts direct current to voltage regulator 38, voltage comparator circuit 43, and automatic sequencing pulse circuit 63. Voltage regulator 38 includes adjustable resistance 39 which permits adjustment of regulated voltage output 40 to 26 volts. The reference voltage divider network consists of fixed resistors 57 and 58, and adjustable resistor 41. Reference voltage at 42 is applied to the base of NPN transistor 45. Transistor 46 is biased by resistors 59, 60, and 61 so that it operates as a constant current source for the emitter current of transistor 45. Battery 56 lowers the operating potentials of transistor 46 below the potential of the negative supply providing reliable control of the voltage at point 47 down to approximately 1 volt. The positive voltage from the storage device being monitored is applied to the base of transistor 48 by line 44. The proportionalities of the voltages at 42 and 47 are such that if the voltage on line 44 is below the predetermined voltage, set by adjustment of resistor 41, transistor 48 is electrically in the cutoff state, thus the voltage drop across the resistor network 49, 50, and 51 is very small. This, in turn, places transistors 52, 53, and 54 in the cutoff state and essentially no current flows through relay 55.

When the voltage on line 44 equals or exceeds the predetermined value, transistors 48, 52, 53, and 54 are driven into conduction and current flows through the winding of relay 55 closing contacts 69. The closing of contacts 69 permits current to flow to stepping switch 1a and through the appropriate terminals of bank B that are mechanically synchronized with terminals of banks D and E which are connected to the cell being monitored. This current flow energizes the latching relay associated with that particular cell and removes it from the charging circuit.

Plug jack 70 provides a means for the connection of an external voltmeter, permitting the voltage of the cell being monitored to be made observable. This enables the operator, while setting up the system, to adjust resistance 41 to set the value of the fully charged voltage at which the cells are automatically removed from charge.

Switch 62 is used to turn the voltage regulator and comparator circuits on and off. It is shown in the off position.

Sequencing pulse circuit 63 is a conventional multivibrator circuit utilizing a double-based diode 71 and transistor 72. Adjustable resistor 66 is used to set the rate of pulsing. The pulses from the multivibrator energize relay 67 which, in turn, energizes the stepping switch drive solenoid 68. Switch 64 is used to place the sequencing of the stepping switch in the automatic mode or manual mode of operation. In the automatic mode, sequencing is controlled by the multivibrator circuit; in the manual mode, push button switch 65 must be manually depressed to advance the stepping switch one position at a time. Switch 64 is shown in the manual control position.

Latching relay 11a turns the charging system on and off. To turn the system on, the latching relay is energized to the on position by depressing momentary switch 73. With the automatic shutoff switch 74 closed, latching relay 11a is energized to the off position by the completion of the operation of all the latching relays associated with the individual cells, each relay operating as each cell becomes charged. Indicator light 13a is illuminated when latching relay is energized to the off position indicating that all the cells have been charged.

FIGURE 4 shows the circuitry for ten charging positions. Another group of ten charging positions identical with the ten shown are used to complete the system shown in FIGURE 2 and FIGURE 3. The second group of ten positions are not shown as it would be unnecessary duplication. Note that, connection strip 75 mates with either connection strip 75a or 75b of FIGURE 3, number for number, and that the second group of ten positions likewise will connect with the remaining strip whether it be either 75a or 75b.

"Battery" clips 76 through 95 are used to connect to the cells being charged. Jacks 96 through 115 provide a means of connecting discharge devices to individual cells, so that discharging of the cells may be accomplished without removing or disconnecting them from the charging system. Momentary double-throw switches 116 through 125 energize latching relays 126 through 135 providing a means of selectively removing individual cells from the charging string or the insertion of cells into the charging string independent of the automatic system. As each cell is removed from the charging string, either automatically or by manual operation of the momentary switch, the appropriate indicator light of the group of lights 136 through 145 is illuminated.

Although but a single preferred embodiment of the present invention is illustrated and described herein, it should be obvious to those persons skilled in the art that various changes and modifications are possible within the spirit of the invention. Therefore, it is desired that the particular form of the present invention described herein shall be considered as illustrative and not as limiting.

What is claimed is:

1. A charging and automatic monitoring system operating from a source of electrical power for automatically charging a plurality of electrical storage devices, each to a common predetermined voltage comprising: a source of unidirectional current having a first polarity and a second polarity; a current limiting means including, a semiconductor device having a collector, an emitter, and a base, a variable resistor connected between said emitter and said first polarity of source of unidirectional current, a semiconductor diode and a resistive component connected to said base; a current boost means including a semiconductor device having a collector, an emitter, and a base, a Zener diode connected between said base and said emitter, and a resistive component connected between junction of said Zener diode and said base and second polarity of said source of unidirectional current; a plurality of paired terminal means for connecting to said electrical storage devices; a plurality of latching relays having multiple double throw switching contacts; connecting means connecting each pair of said plurality of paired terminals to switching contacts of a respective latching relay of said plurality of latching relays; connecting means, including switching contacts of each of said plurality of latching relays, connecting said paired terminal means in electrical series relationship, and with said current boost means; a source of regulated unidirectional voltage providing a reference voltage; a rotary stepping switch having multiple poles connected to switching contacts of each latching relay of said plurality of latching relays; means for periodically actuating said stepping switch; a voltage comparator means having an electrical output responsive to comparison of said reference voltage and voltage from said stepping switch including, a first semiconductor device having a collector, an emitter, and a base, a second semiconductor device having a collector, an emitter, and a base, connecting means conducting said reference voltage to base of said first semiconductor device, connecting means conducting voltage from said stepping switch to base of said second semiconductor device, a current regulating means including a third semiconductor device, connecting means connecting said current regulating means to said emitter of said first semiconductor device and to emitter of said second semiconductor device in parallel relationship; a relay operable from said electrical output of voltage comparator, said relay cooperating with said source of electrical power and said rotary stepping switch to energize said latching relays; an additional latching relay cooperating with said plurality of latching relays and said source of electrical power to disconnect said charging system from said source of electrical power.

2. A charging system operating from a source of electrical power for automatically charging a plurality of electrical storage devices, each to a common predetermined voltage comprising: a source of unidirectional current; current limiting means cooperating with the said source of unidirectional current for limiting the said unidirectional current to a predetermined value; a voltage responsive current boost means cooperating with the said current limiting means for providing a relatively fixed rate of charge; a plurality of paired terminal means for connecting to said electrical storage devices; a plurality of latching relays having multiple double throw switching contacts; connecting means connecting each pair of said plurality of paired terminals to switching contacts of a respective latching relay of said plurality of latching relays; connecting means, including switching contacts of each of said plurality of latching relays, connecting said paired terminal means in electrical series relationship, and with said current boost means; a source of regulated unidirectional voltage providing a reference voltage; a multiple pole rotary stepping switch connected to switching contacts of each latching relay of said plurality of latching relays; means for periodically actuating said stepping switch; a voltage comparator means providing an electrical output responsive to comparison of said reference voltage and voltage from said stepping switch; a relay operable from said electrical output of voltage comparator, said relay cooperating with said source of electrical power and said rotary stepping switch to energize said latching relays; and an additional latching relay cooperating with said plurality of latching relays and said source of electrical power to disconnect said charging system from said source of electrical power.

3. The charging system as in claim 2 wherein the said current limiting means includes: a semiconductor device having a collector, an emitter, and a base; a variable resistor connected to said emitter; a semiconductor diode; a resistive component connected to said semiconductor diode; connecting means from said base of semiconductor device to junction of said resistive component and said semiconductor diode.

4. The charging system as in claim 2 wherein the said current boost means includes: a semiconductor device having a collector, an emitter, and a base; a Zener diode connected between said base and said emitter; a resistive component connected between junction of said Zener diode and said base and one polarity of said source of regulated unidirectional current.

References Cited by the Examiner

UNITED STATES PATENTS

| | | | |
|---|---|---|---|
| 2,988,694 | 6/1961 | Hessinger et al. | 324—98 X |
| 3,062,998 | 11/1962 | Medlar | 320—33 |
| 3,100,862 | 8/1963 | Collier | 320—48 X |
| 3,141,124 | 7/1964 | Atherton | 320—1 |
| 3,176,210 | 3/1965 | Bethke | 320—40 |

FOREIGN PATENTS 599,415  3/1948  Great Britain.

JOHN F. COUCH, *Primary Examiner.*

LLOYD McCOLLUM, *Examiner.*

S. WEINBERG, *Assistant Examiner.*